(12) United States Patent
Ye (10) Patent No.: US 11,429,228 B2
(45) Date of Patent: Aug. 30, 2022

(54) GRATING TOUCH SCREEN BASED ON LATTICE STRUCTURE DISTRIBUTION

(71) Applicant: Shanghai Jiao Tong University, Shanghai (CN)

(72) Inventor: Zhicheng Ye, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 0 days.

(21) Appl. No.: 17/227,200

(22) Filed: Apr. 9, 2021

(65) Prior Publication Data

US 2021/0232243 A1 Jul. 29, 2021

Related U.S. Application Data

(63) Continuation of application No. PCT/CN2020/076907, filed on Feb. 27, 2020.

(30) Foreign Application Priority Data

Sep. 16, 2019 (CN) .......................... 201910871622.4

(51) Int. Cl.
*G06F 3/042* (2006.01)

(52) U.S. Cl.
CPC .... *G06F 3/042* (2013.01); *G06F 2203/04109* (2013.01)

(58) Field of Classification Search
CPC ........... G06F 3/042; G06F 2203/04109; G06F 3/0354; G06F 3/0386; G06F 3/0421; G01N 21/7743; G02B 6/12009; G02F 2201/305; G02F 2201/30; G02F 2201/307; G02F 1/095

See application file for complete search history.

(56) References Cited

U.S. PATENT DOCUMENTS

| | | | | |
|---|---|---|---|---|
| 5,461,400 | A | * 10/1995 | Ishii | ...................... G06F 3/0412 345/182 |
| 2002/0080484 | A1 | * 6/2002 | Moshrefzadeh | ..... G03B 21/625 359/460 |
| 2010/0103140 | A1 | 4/2010 | Hansson | |
| 2012/0038591 | A1 | * 2/2012 | Chen | ...................... G06F 3/0418 345/175 |
| 2013/0162555 | A1 | 6/2013 | Jensen | |
| 2020/0033514 | A1 | * 1/2020 | Meng | ...................... G01N 21/31 |
| 2020/0264378 | A1 | * 8/2020 | Grant | ................. G02B 27/0103 |

FOREIGN PATENT DOCUMENTS

| | | |
|---|---|---|
| CN | 103677448 A | 3/2014 |
| CN | 104020896 A | 9/2014 |
| KR | 20080008064 A | 1/2008 |

* cited by examiner

*Primary Examiner* — Patrick N Edouard
*Assistant Examiner* — Joseph P Fox
(74) *Attorney, Agent, or Firm* — Mei & Mark LLP; Manni Li (57) ABSTRACT

A grating touch screen based on lattice structure distribution comprises a laser light source, an optical waveguide layer, a grating and a photoelectric detector. In the present invention, the grating with the lattice structure distribution is reasonably arranged on the optical waveguide layer, so that the efficiency of detection light from the laser light source reaching the photoelectric detector at a periphery through the grating touch screen is maximized, and the sensitivity of the touch screen is effectively improved.

7 Claims, 5 Drawing Sheets

GRATING TOUCH SCREEN BASED ON LATTICE STRUCTURE DISTRIBUTION

CROSS-REFERENCE TO RELATED APPLICATIONS

The subject application is a continuation of PCT/CN2020/076907 filed on Feb. 27, 2020, which claims priority on Chinese Application No. CN201910871622.4 filed on Sep. 16, 2019 in China. The contents and subject matter of the PCT international application and Chinese priority application are incorporated herein by reference.

TECHNICAL FIELD

The present invention relates to information display, in particular to a grating touch screen based on lattice structure distribution.

BACKGROUND ART

Touch screens are divided into four basic types according to different technical principles: resistive touch screen, capacitive touch screen, surface acoustic wave touch screen, and infrared touch screen. The resistive touch screen is a touch screen composed of two highly transparent conductive layers, usually separated by an elastic material. When the pressure on the touch screen is large enough, contact occurs between the two layers, and a sensor reads a contact voltage to determine coordinates of a touch point. The resistive touch screen has the advantages of high precision, low cost, is not influenced by dust, water vapor, and oil dirt, and can be touched by any object, however, it is low in light transmittance and not wear-resistant.

The capacitive touch screen is configured that an indium tin oxide (ITO) layer is respectively coated on an inner surface and an interlayer of the glass screen. When a finger touches the capacitive screen, due to the electric field of the human body, a coupling capacitor is formed between the finger and the working surface, the finger would absorb a small current, and the controller determines information on the touch position through current change. The capacitive screen has the advantages of wear resistance and long service life, but when the ambient temperature and humidity change, the capacitive screen drifts and is easy to be influenced by electromagnetic signals, and must be a conductor for touch control.

The surface acoustic wave touch screen is composed of a touch screen, an acoustic wave generator, a reflector, and an acoustic wave receiver. When a finger touches the screen, the acoustic wave on the contact point can be prevented, and accordingly, touch coordinates are determined. The surface acoustic wave touch screen has good optical performance and scratch resistance, but is easily affected by ash layer, water drop, and oil stain.

The above three type of touch screens are mainly applied to small-size and medium-size display devices.

The infrared touch screen is configured that an infrared transmitting tube and an infrared receiving tube are arranged on four sides of the display. When a user touches the screen, the finger blocks infrared rays passing through the position, and accordingly the position of a touch point on the screen can be determined. At present, the infrared touch screen occupies a dominant position in the large-size touch market but is still a traditional touch screen, thus, the size of the touch screen is limited.

The touch screen requires contact interaction between an operator and the touch screen. The physical limitation that the operator can make an interaction needs to be considered in the contact interaction, and the size of the touch screen is undoubtedly limited. At present, non-contact interaction in the market is mainly based on human-computer interaction of image processing, but the interaction mode has the defects of high cost, complex algorithm, and large delay.

Chinese Patent Application No. 201410203219.1 discloses an optical touch screen based on a grating. Although the touch screen does not require an additional light source, after the display light is reflected by the grating for multiple times, the light intensity is obviously reduced. Due to the fact that only the display light is utilized, the efficiency and touch precision of the touch screen are low. On the other hand, as the grating is arranged on a whole surface of the optical waveguide, large transmission loss may occur.

SUMMARY OF INVENTION

The present invention solves the problems of the existing technology and provides a grating touch screen based on lattice structure distribution, which uses a laser light source as detection light for touch control of an interactive medium and provides larger operation space for an operator so as to realize interaction with a large-size touch screen. In addition, due to the fact that the lattice structure of the grating is used, the transmission loss of coupled light in an optical waveguide layer is effectively reduced, and the efficiency, the light transmission performance, and the sensitivity of the touch screen are greatly improved.

The technical solutions of the present invention are as follows:

The present invention provides a grating touch screen based on lattice structure distribution, comprising a laser light source, an optical waveguide layer, a grating, and a photoelectric detector. The grating is distributed on the optical waveguide layer in a lattice structure, the photoelectric detector is arranged on a periphery or two adjacent sides of the optical waveguide layer, the laser light source outputs laser with a specific wavelength as detection light for touch, and a period, a duty ratio, and a grating height are selected to control a number of reflection times n, a loss efficiency, and a coupling efficiency of the grating to maximize an efficiency of the grating touch screen.

In the present invention, when the grating is a one-dimensional structure, the optical waveguide layer is divided into an upper layer and a lower layer, with the lattice structure of the grating arranged on the upper layer and the lower layer of the optical waveguide layer, a grating direction on the upper layer of the optical waveguide layer and a grating direction on the lower layer of the optical waveguide layer being perpendicular to each other; when the grating is a two-dimensional structure, the lattice structure of the grating is arranged in an X direction and a Y direction.

In the present invention, the grating in a lattice structure unit has a single period or a gradually changed period.

In the present invention, when the length of the optical waveguide layer is equal to a width of the optical waveguide layer, the photoelectric detectors are arranged on two adjacent sides of the optical waveguide layer; when the length of the optical waveguide layer is not equal to a width of the optical waveguide layer, and the photoelectric detectors are arranged on two opposite short sides and one long side of the optical waveguide layer.

In the present invention, an optical filter may be provided between the optical waveguide layer and the photoelectric detector.

In the present invention, an isolation layer and a display screen are sequentially arranged below the optical waveguide layer.

In the present invention, the period of the grating enables laser to be coupled into the optical waveguide layer, the whole surface of the grating covers the optical waveguide layer, and the efficiency of the touch screen is as follows:

$$C_t = C_j * \Pi_{i=1}^n (1-L_i).$$

$C_j$ is the coupling efficiency of the grating in region j, the range of region j is [(j−1)Nd,jNd], d is the transmission distance of a single reflection, N is a positive integer, and $$j \in \left[1, \frac{n}{N}\right].$$

n is the number of times the coupled light reflects at an interface of the waveguide layer with the grating. $L_i$ is the grating loss efficiency for the ith reflection. Preferably, setting appropriate grating period, duty ratio and grating height to control the number of reflection times n, loss efficiency $L_i$ and coupling efficiency $C_j$ such that the efficiency $C_t$ of the touch screen is maximized.

In the present invention, the grating is distributed on the optical waveguide layer in a lattice structure, and no grating exists between the lattices. The efficiency of the grating touch screen distributed in the lattice structure can be expressed as follows:

$$C_d = duty_j * C_j * \Pi_{i=1}^n (1-k_i L_i).$$

$C_j$ is the coupling efficiency of the grating in region j, $duty_j$ is the duty ratio of the lattice structure in region j, the range of region j is [(j−1)Nd,jNd], d is the transmission distance of a single reflection, N is a positive integer, and $$j \in \left[1, \frac{n}{N}\right].$$

N is the number of reflection times the coupled light reflects at the interface of the waveguide layer with the grating. $k_i$ is the loss factor, and $k_i \in [0,1]$. $L_i$ is the grating loss efficiency for the ith reflection. Preferably, the period and duty ratio of the lattice structure are set such that the efficiency of the touch screen $C_d$ is maximized.

Compared with the existing technology, the present invention provides the following beneficial effects. According to the present invention, by using the laser light source as the interaction medium, larger operation space can be provided for an operator, so that interaction with a large-size touch screen can be realized. In addition, due to the fact that the grating with a lattice structure is used, the transmission loss of coupled light in the optical waveguide layer is effectively reduced, and the sensitivity of the touch screen is greatly improved.

BRIEF DESCRIPTION OF THE DRAWINGS

FIGS. 1A and 1B show grating touch screen based on lattice structure of the present invention, where FIG. 1A shows the top view and FIG. 1B shows the side view.

Reference numbers in the figures refer to the following structure: 201—laser light source, 202—optical waveguide layer, 203—grating, 204—photoelectric detector.

DETAILED DESCRIPTION OF THE INVENTION

The present invention is described in detail with reference to the embodiments and figures, but the scope of the present invention should not be limited thereby.

Figure 1A:
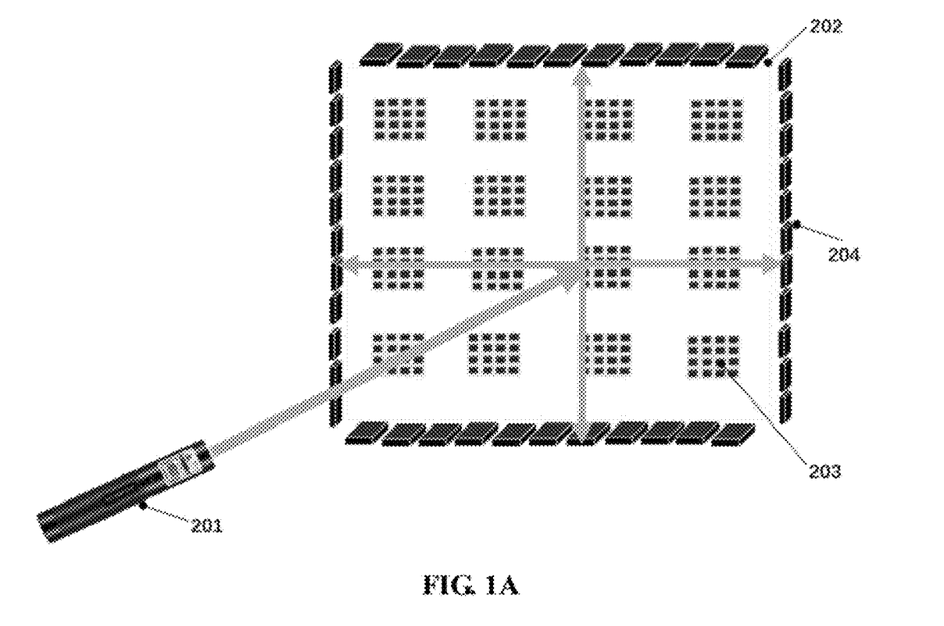
Figure 1B:
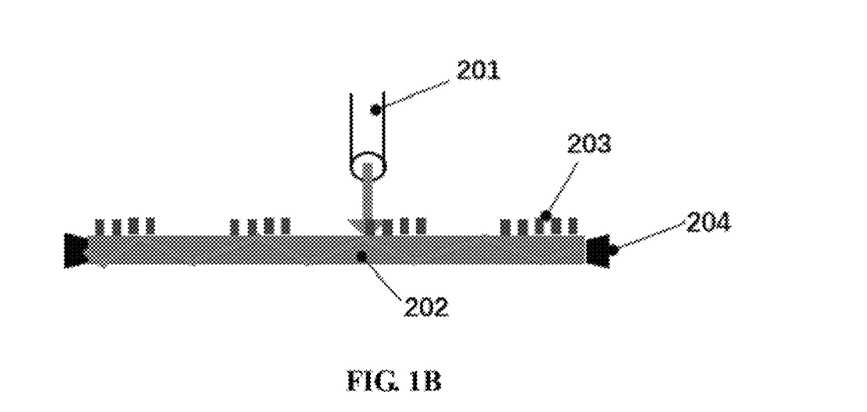

First, as shown in FIGS. 1A and 1B, the grating touch screen based on lattice structure of the present invention comprises a laser light source 201, an optical waveguide layer 202, a grating 203 and a photoelectric detector 204, wherein the grating is covered on the optical waveguide layer 202 or embedded in the optical waveguide layer 202 in a lattice structure. The lattice structure is not limited to the rectangle as shown in FIGS. 1A and 1B, and other arbitrary patterns are possible. The photoelectric detectors 204 are disposed on four sidewalls or two adjacent sidewalls of the optical waveguide layer 202, respectively.

The grating 203 enables light with a specific wavelength from the laser light source 201 to be a waveguide mode which can be transmitted in the optical waveguide layer 202. When touch control is generated, the laser enters the optical waveguide layer 202 through the grating 203 and is transversely transmitted in the optical waveguide layer, and finally reaches the photoelectric detectors 204, so that current of the corresponding photoelectric detector becomes larger, and the position where the touch control occurs is judged. The feasibility of the present invention is demonstrated by theoretical analysis as follows.

The +1-order and −1-order diffraction equation for grating waveguides:

$$k_0 n_0 < \left| k_0 n_0 \sin\theta \pm \frac{2\pi}{T} \right| = k_0 * n_{e\!f\!f} < k_0 n_1 \qquad (1)$$

$k_0$ is the number of waves in vacuum, $n_0$ is a refractive index of incident medium, θ is an incident angle of the incident light, T is the grating period, $n_{e\!f\!f}$ is an effective refractive index of the waveguide, and $n_1$ is a refractive index of the waveguide. In the absolute value part of the formula (1), a positive sign is taken for the +1-order diffracted light, and a negative sign is taken for the −1-order diffracted light.

$$n_1 > n_0, |\theta| \in \left[0, \frac{\pi}{2}\right).$$

It can be obtained from the deformation of formula (1) that, in order to make the diffracted light of +1-order become the waveguide mode in the waveguide, the grating period satisfies the following conditions:

$$\frac{\lambda}{n_2 - n_0 \sin\theta} < T < \frac{\lambda}{n_0 - n_2 \sin\theta} \qquad (2)$$

Similarly, diffracted light of −1-order should satisfy the following conditions:

$$\frac{\lambda}{n_1 + n_0 \sin\theta} < T < \frac{\lambda}{n_0 + \sin\theta} \qquad (3)$$

Where $\lambda$ is the wavelength of the incident light in vacuum.

Figure 2:
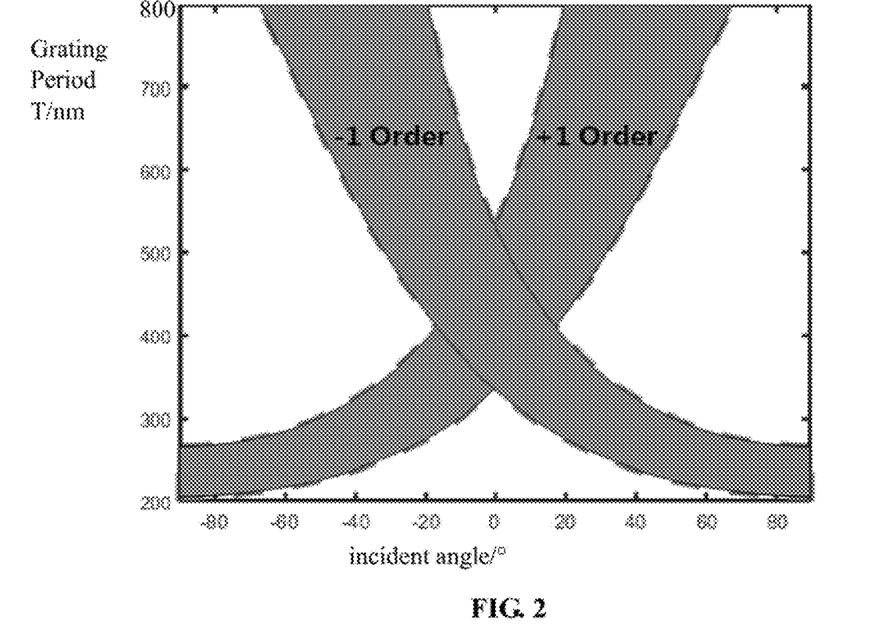
FIG. 2 shows the incident angle versus the grating period at normal incidence of incident light in the present invention.
Figure 3:
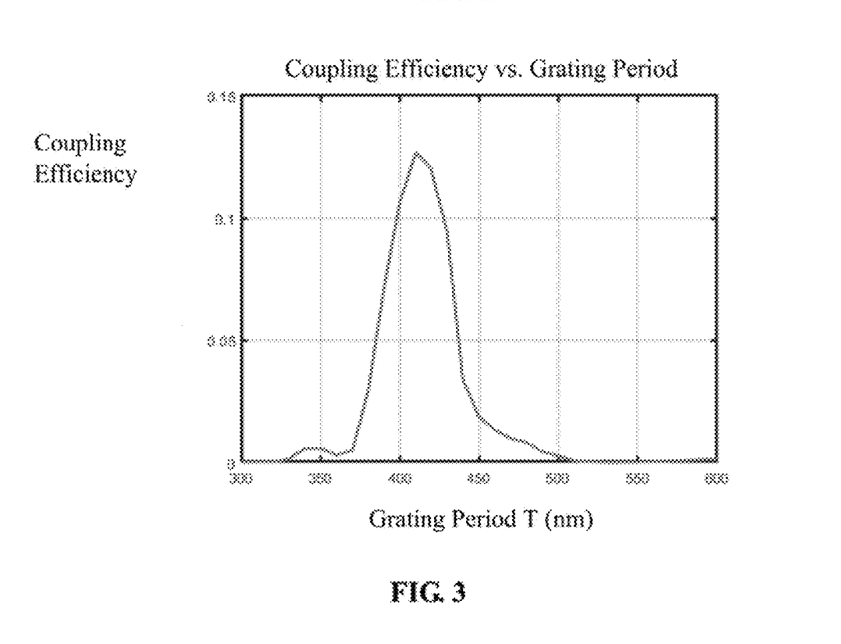
FIG. 3 shows corresponding ±1 order coupling efficiency versus the grating period at normal incidence of incident light in the present invention.
Figure 4:
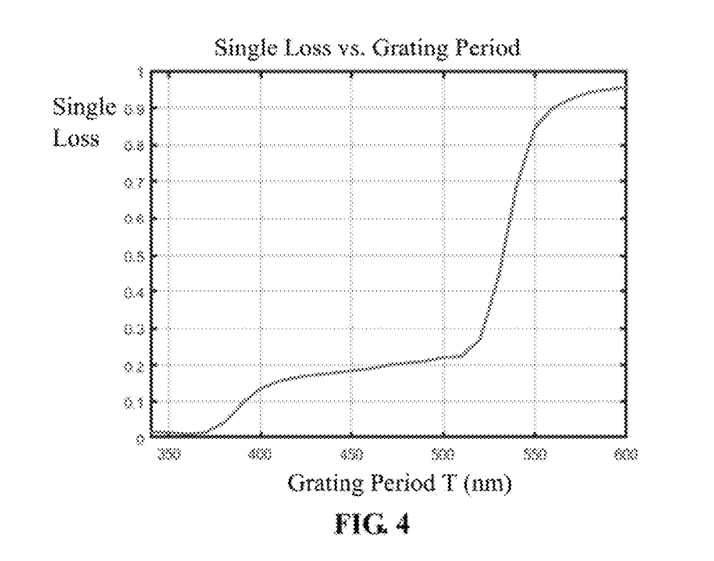
FIG. 4 shows corresponding single loss versus the grating period at normal incidence of incident light in the present invention.

When the wavelength $\lambda$ and the incident angle $\theta$ of the incident light are determined, as long as the grating period T satisfies Formula (2) and Formula (3), the incident light can become a waveguide mode and be transmitted laterally in the light wave. When the refractive index of the waveguide $n_1=1.59$ and the wavelength of the incident light $\lambda=$S32 nm, the incident angle $\theta$ versus the grating period T is as shown in FIG. 2, from which the appropriate grating period T can be selected. FIG. 3 is a graph of grating coupling efficiency versus grating period at normal incidence, i.e., $\theta=0$, and FIG. 4 is a graph of single loss versus the grating period at normal incidence, the single loss being the loss of coupled light when reflected at an interface of the optical waveguide layer with the grating.

Figure 5:
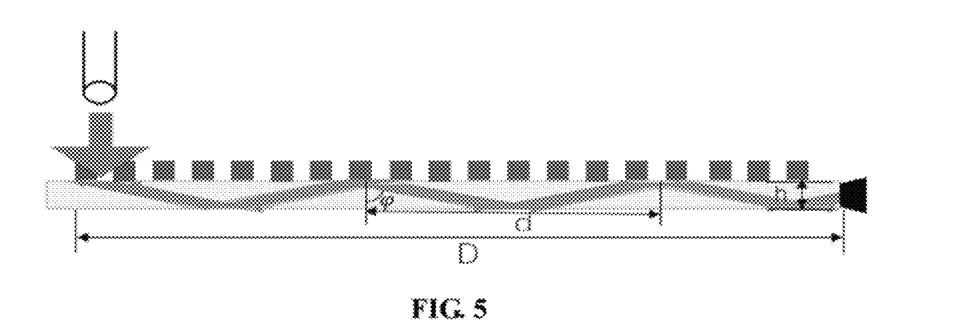
FIG. 5 shows the structure of the grating over the whole surface of an optical waveguide layer in the present invention.

Firstly, the efficiency of touch screen is discussed when the grating is covered on the whole surface of the optical waveguide layer. The grating discussed here is a uniform grating. With reference to FIG. 5, D is a total transmission distance of the coupled light in the waveguide layer, d is the transmission distance of a single reflection, h is a thickness of the waveguide layer, and $\varphi$ is a diffraction angle. Assuming an intensity of the incident light to be I and a light spot area to be A, then the efficiency of the touch screen, i.e. the ratio of an output power $P_0$ to an input power, has the following relationship:

$$P_0 = P_i * C * (1 - L)^n \qquad (4)$$

$$P_i = I * A \qquad (5)$$

$$d = 2 * h * \tan\varphi \qquad (6)$$

$$n = \frac{D}{d} \qquad (7)$$

C is the grating coupling efficiency, L is the loss efficiency for a single reflection, and n is the number of reflection times.

For large-screen touch control, the loss is mainly caused by that a part of coupled light in the waveguide is coupled out through the grating when the coupled light is reflected at an interface of the waveguide layer with the grating, so that the loss is generated every time the reflection occurs at the interface. The loss is increased along with the size of the optical film, and obviously the efficiency required by large-screen touch control is difficult to meet.

To reduce the loss and improve the efficiency of touch screen, a grating touch screen based on lattice structure is provided in the present invention. The design of the grating with lattice structure reduces the coupling efficiency, but greatly reduces the total loss, thereby greatly improving the efficiency of touch control.

Figure 6:
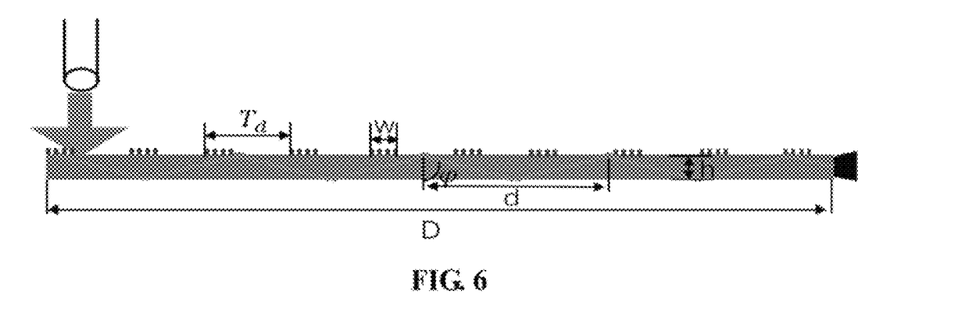
FIG. 6 shows the grating with the lattice structure over the optical waveguide layer in the present invention.

Next, the efficiency of the touch screen is discussed when the grating is covered with a lattice structure on the optical waveguide layer, and a rectangular lattice structure is taken as an example, but the scope of the present invention should not be limited thereby. As shown in FIG. 6, $T_d$ is the period of the lattice grating, $w_j$ is a length of the grating part of the lattice in the region j, and $duty_j$ is set as the duty ratio of the lattice in the region j. According to Formula (4), the output power of the rectangular lattice grating can be expressed as:

$$P_0 = P_i * duty_j * C * \prod_{i=1}^{n} (1 - k_i L) \qquad (8)$$

$$duty = \frac{w_j}{T_d} \qquad (9)$$

wherein $k_i$ is a loss factor, $k_i \in [0,1]$.

Figure 7A:
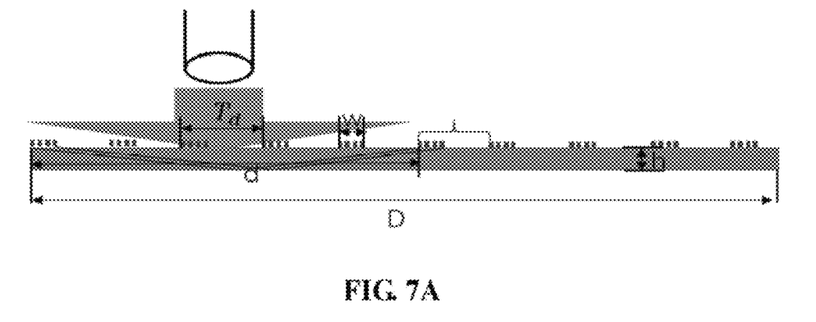
FIGS. 7A and 7B show different positions of the first reflections corresponding to light spots under selection of different lattice periods in the present invention.
Figure 7B:
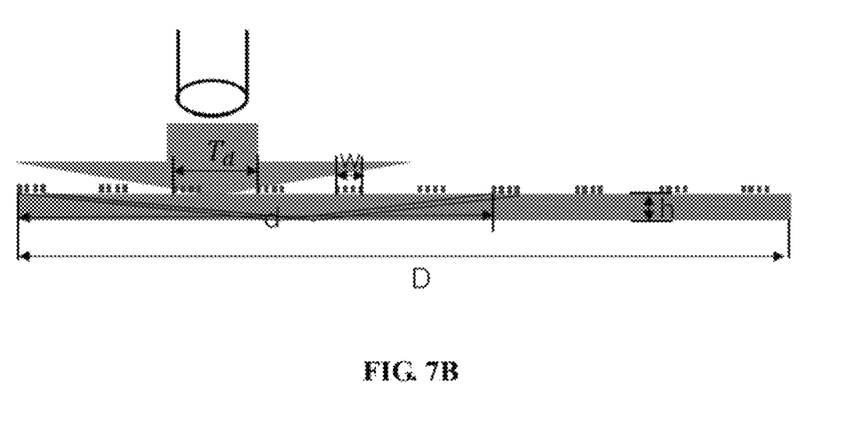

An optimal grating with lattice structure can be obtained through specific algorithm optimization, so that the efficiency of the touch screen is maximum, namely $P_0$ is maximum. In the following, the optimization process will be described in detail. Since the value of $k_i$ is determined by the period $T_d$ of the lattice structure and the duty ratio of the lattice, the optimization of the optimal efficiency mainly relates to optimizing the period and the duty ratio of the lattice structure. With reference to FIG. 7A, it is assumed that the upper limit of the period of the scanned grating with lattice structure is as follows:

$$T_{dmax} = \frac{d}{N} \qquad (10)$$

wherein N is a positive integer, and the obtained value of N should enable the number of lattice(s) contained in the light spot to be larger than or equal to 1. With reference to FIG. 7B, it is assumed that the lower limit of the period of the scanned grating with lattice structure is as follows:

$$T_{dmin} = \frac{d}{N+1} \qquad (11)$$

When $T_{dmin} \leq T_d \leq T_{dmax}$, the light spot of the first total reflection can fall at different positions of the lattice structure. An appropriate scanning step length can be selected according to actual requirements, a group of equally spaced lattice structure periods can be obtained, and different duty ratios can be scanned in each scanning period. When the lattice period and duty ratio are determined, different values of $k_i$ in formula (8) can be calculated by the program according to geometric relationship, and finally the output power can be obtained. Through analogy, a group of $P_O$s can be obtained, then the maximum $P_O$ is selected, and the lattice period and the duty ratio corresponding to the maximum $P_O$ are obtained.

Figure 8:
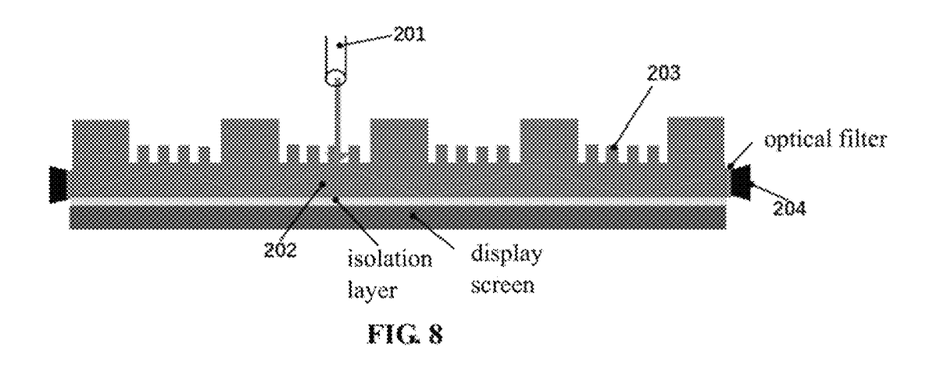
FIG. 8 shows the structure of the first embodiment of the present invention.

In the first embodiment of the present invention as show in in FIG. 8, the grating 203 is embedded in the optical waveguide layer 202 in a lattice structure in an embedded manner for protection. Photoelectric detectors 204 are disposed on four sidewalls or two adjacent sidewalls of the optical waveguide layer 202. When the grating 203 is a one-dimensional structure, the optical waveguide layer is divided into an upper layer and a lower layer, the grating direction on the upper layer of the optical waveguide layer and the grating direction on the lower layer of the optical waveguide layer are perpendicular to each other. Preferably, the grating structure and the lattice structure are arranged on the upper layer and the lower layer of the optical waveguide layer, and their structures respectively are selected to control a number of reflection times n, a loss efficiency, and a coupling efficiency of the grating 203 to maximize an efficiency of the grating touch screen. When the grating 203 is a two-dimensional structure, preferably, the grating structure and the lattice structure are provided in an X-direction and a Y-direction, and their structures respectively are selected to control a number of reflection times n, a loss efficiency, and a coupling efficiency of the grating 203 to maximize an efficiency of the grating touch screen. To reduce interference from ambient light, optical filters are attached to the sidewalls of the optical waveguide layer 202 adjacent to the photoelectric detectors 204. The optical waveguide layer 202 is a transparent material. Below the optical waveguide layer 202 are an isolation layer and a display screen respectively, but the application scene is not limited to the display screen. The purpose of the isolation layer is not to influence the total reflection of the coupled light on a lower surface of the optical waveguide layer 202.

In operation, the laser light source emits laser light, first through the grating 203. When the laser passes through the grating 203, a part of light is coupled into the optical waveguide layer 202 to become the waveguide mode and is transversely transmitted in the optical waveguide. Most of the light will pass longitudinally through the optical waveguide layer 202. When the coupled light is transmitted transversally and finally reaches the sidewall of the optical waveguide layer 202, the coupled light can be detected by the photoelectric detector 204 positioned on the sidewall, the light intensity detected by the photoelectric detector 204 can be increased, and the position of touch control can be determined according to the position of the photoelectric detector and the light intensity thereof. Through the solution, non-contact touch control can be realized.

Figure 9:
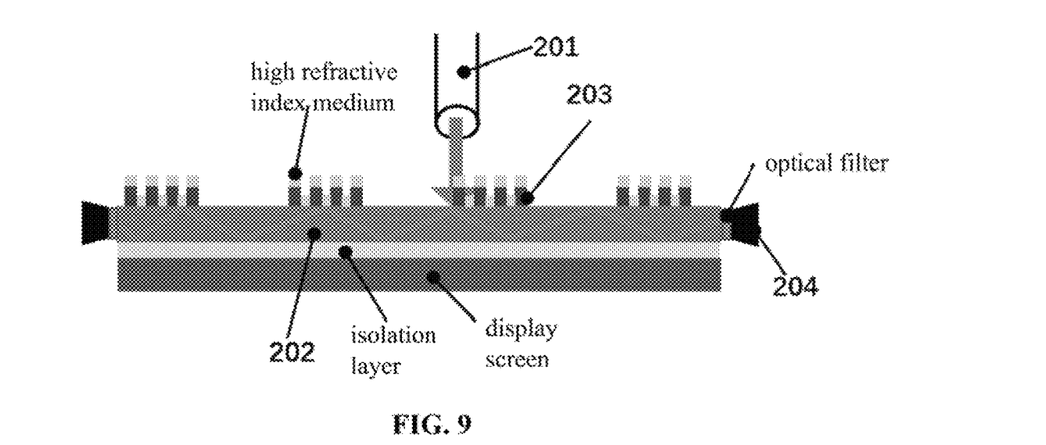
FIG. 9 shows the structure of the second embodiment of the present invention.

In the second embodiment as shown in FIG. 9, unlike the first embodiment, the second embodiment protects the grating 203 and improve the grating coupling efficiency by plating a medium with high refractive index on the structure of grating 203. Photoelectric detectors 204 are disposed on four sidewalls or two adjacent sidewalls of the optical waveguide layer 202. When the grating 203 is a one-dimensional structure, the optical waveguide layer is divided into an upper layer and a lower layer, and the grating direction on the upper layer of the optical waveguide layer and the grating direction on the lower layer of the optical waveguide layer are perpendicular to each other. Preferably, the grating structure and the lattice structure are arranged on the upper layer and the lower layer, and their structures, respectively are selected to control a number of reflection times n, a loss efficiency, and a coupling efficiency of the grating 203 to maximize an efficiency of the grating touch screen. When the grating 203 is a two-dimensional structure, preferably, the grating structure and the lattice structure are provided in an X-direction and a Y-direction, and their structures respectively are selected to control a number of reflection times n, a loss efficiency, and a coupling efficiency of the grating 203 to maximize an efficiency of the grating touch screen. To reduce interference from ambient light, optical filters are attached to the sidewalls of the optical waveguide layer 202 adjacent to the photoelectric detectors 204. The optical waveguide layer 202 is a transparent material. Below the optical waveguide layer 202 are an isolation layer and a display screen, respectively, but the application scene is not limited to a display screen. The purpose of the isolation layer is not to affect total reflection of the coupled light at the lower surface of the optical waveguide layer 202. The working mode in the second embodiment is similar to that of the first embodiment, and non-contact touch control can be realized.

Figure 10:
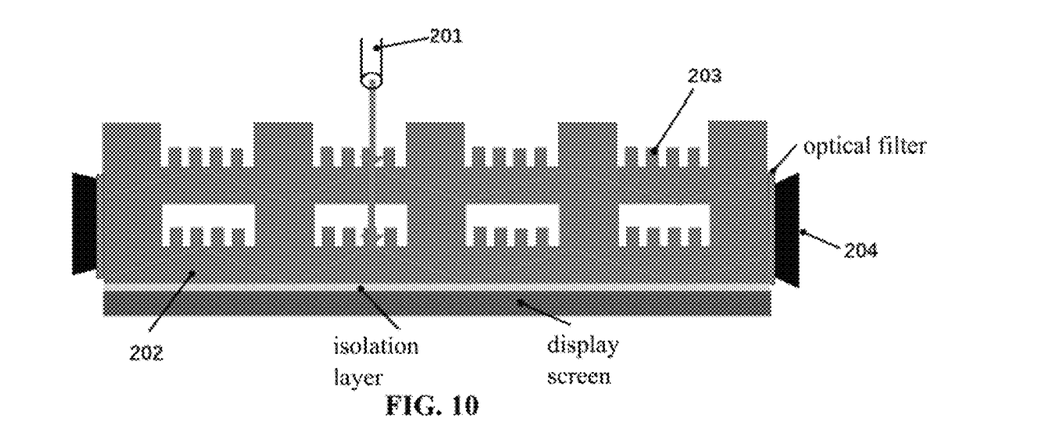
FIG. 10 shows a structure of a third embodiment of the present invention.

As shown in FIG. 10, the third embodiment adopts a structure of a double-layer optical waveguide layer 202 and a grating 203. The grating 203 is a two-dimensional structure. The efficiency of a touch screen can be effectively improved by adopting such a structure, and the grating 203 is embedded into the optical waveguide layer 202 in a lattice structure in an embedded mode as in the first embodiment. Photoelectric detectors 204 are disposed on four sidewalls or two adjacent sidewalls of the optical waveguide layer 202. To reduce interference from ambient light, optical filters are attached to the sidewalls of the optical waveguide layer 202 adjacent to the photoelectric detectors 204. The optical waveguide layer 202 is a transparent material. Below the optical waveguide layer 202 are an isolation layer and a display screen respectively, but the application scene is not limited to the display screen. The purpose of the isolation layer is not to influence the total reflection of the coupled light on a lower surface of the optical waveguide layer 202.

In operation, the laser light source emits laser light, first through the upper layer of the grating 203. When the laser passes through the grating 203, a part of light is coupled into the optical waveguide layer 202 to become the waveguide mode and is transversely transmitted in the upper layer of the optical waveguide layer 202. Most of the light passes through the upper layer of the optical waveguide layer 202 longitudinally and then passes through the lower layer of the grating 203. A part of the light is coupled into the lower layer of the optical waveguide layer 202 to become the waveguide mode and is transversely transmitted in the lower layer of the optical waveguide layer 202. Most of the light passes through the lower layer of the optical waveguide layer 202 longitudinally. When the coupled light is transmitted transversally and finally reaches the sidewall of the optical waveguide layer 202, the coupled light is detected by the photoelectric detector 204 positioned on the sidewall, the light intensity detected by the photoelectric detector 204 is increased, and the position of touch control can be determined according to the position of the photoelectric detector and the light intensity thereof. According to the solution, the efficiency and precision of the touch screen can be effectively improved, and non-contact touch control can be realized.

Experiments show that by means of diffraction of the grating, laser with a specific wavelength becomes a waveguide mode which can be transmitted in the waveguide to serve as detection light for touch control. The photoelectric sensor judges the position where touch control occurs according to the detected light intensity, and non-contact touch control can be realized. By adopting the method of embedding and coating the grating, the service life of the touch screen is effectively guaranteed, and meanwhile, the sensitivity of the touch screen is effectively improved through the use of the grating with the lattice structure.

I claim:

1. A grating touch screen based on lattice structure distribution, comprising
    a laser light source (201),
    an optical waveguide layer (202),
    a grating (203), and
    a photoelectric detector (204),
    wherein the grating (203) is distributed on the optical waveguide layer (202) in a lattice structure,
    the photoelectric detector (204) is arranged on a periphery or two adjacent sides of the optical waveguide layer (202),
    the laser light source (201) outputs laser with a specific wavelength as detection light for touch, and
    a period, a duty ratio, and a grating height are selected to control a number of reflection times n, a loss efficiency, and a coupling efficiency of the grating (203) to maximize an efficiency of the grating touch screen,
    wherein an isolation layer and a display screen are sequentially arranged below the optical waveguide layer (202).

2. The grating touch screen as described in claim 1, wherein the grating (203) is a one-dimensional structure, the optical waveguide layer (202) is divided into an upper layer and a lower layer, with the lattice structure of the grating arranged on the upper layer and the lower layer of the optical waveguide layer, and a grating direction on the upper layer of the optical waveguide layer and a grating direction on the lower layer of the optical waveguide layer being perpendicular to each other.

3. The grating touch screen as described in claim 1, wherein the grating (203) is a two-dimensional structure, and the lattice structure of the grating is arranged in an X direction and a Y direction.

4. The grating touch screen as described in claim 1, wherein the grating (203) in a lattice structure unit has a single period or a gradually changed period.

5. The grating touch screen as described in claim 1, wherein a length of the optical waveguide layer (202) is equal to a width of the optical waveguide layer (202), and the photoelectric detectors (204) are arranged on two adjacent sides of the optical waveguide layer.

6. The grating touch screen as described in claim 1, wherein a length of the optical waveguide layer (202) is not equal to a width of the optical waveguide layer (202), and the photoelectric detectors (204) are arranged on two opposite short sides and one long side of the optical waveguide layer.

7. The grating touch screen as described in claim 1, wherein an optical filter is provided between the optical waveguide layer (202) and the photoelectric detector (204).

* * * * *